United States Patent [19]

Klamm

[11] Patent Number: 5,746,495
[45] Date of Patent: May 5, 1998

[54] PORTABLE WORK LIGHT WITH OPTICAL FIBER ADAPTER

[76] Inventor: Thomas L. Klamm, 253 N. Wisconsin St., Racine, Wis. 53402

[21] Appl. No.: 795,732

[22] Filed: Feb. 5, 1997

[51] Int. Cl.$^6$ .............................. F21V 8/00; F21V 29/00; F21V 21/26; F21L 7/00
[52] U.S. Cl. .............. 362/32; 362/183; 362/190; 362/194; 362/197; 362/202; 362/205; 362/285; 362/373; 362/418
[58] Field of Search .............. 362/32, 183, 186, 362/190, 191, 194, 197, 202, 205, 206, 218, 285, 371, 373, 418

[56] References Cited

U.S. PATENT DOCUMENTS

| | | | |
|---|---|---|---|
| 1,506,303 | 8/1924 | Hopkins | 362/183 |
| 1,538,992 | 5/1925 | Hopkins | 362/183 |
| 3,944,805 | 3/1976 | Moore | 362/194 |
| 4,364,104 | 12/1982 | Holahan et al. | 362/223 |
| 4,369,486 | 1/1983 | Pool | 362/32 |
| 4,495,550 | 1/1985 | Visciano | 362/189 |
| 4,533,982 | 8/1985 | Kozar | 362/183 |
| 4,586,117 | 4/1986 | Collins | 362/373 |
| 4,605,990 | 8/1986 | Wilder et al. | 362/32 |
| 4,713,735 | 12/1987 | Hiltman | 362/183 |
| 4,818,049 | 4/1989 | Assenheim et al. | 385/35 |
| 4,839,783 | 6/1989 | Arai | 362/374 |
| 4,907,133 | 3/1990 | Nath | 362/32 |
| 4,961,028 | 10/1990 | Tanaka | 315/91 |
| 4,975,810 | 12/1990 | Vanderbel | 362/32 |
| 5,093,763 | 3/1992 | Vandershuit et al. | 362/18 |
| 5,099,399 | 3/1992 | Miller et al. | 362/32 |
| 5,154,483 | 10/1992 | Zeller | 362/198 |
| 5,163,752 | 11/1992 | Copeland et al. | 362/396 |
| 5,400,425 | 3/1995 | Nicholas et al. | 385/76 |
| 5,450,293 | 9/1995 | Hoffman | 362/32 |
| 5,455,751 | 10/1995 | Lynch et al. | 362/194 |
| 5,541,822 | 7/1996 | Bamber | 362/190 |
| 5,615,938 | 4/1997 | Lemke | 362/18 |

FOREIGN PATENT DOCUMENTS

87/03354  6/1987  WIPO .......................... 362/183

*Primary Examiner*—Ira S. Lazanu
*Assistant Examiner*—Ljiljana V. Ciric
*Attorney, Agent, or Firm*—Quarles & Brady

[57] ABSTRACT

A portable work light has a handle to which a head is pivotally attached. The head houses a light source and a reflector that projects a beam of light. The head has an air inlet and outlet with a fan that forces air from the inlet to outlet thereby cooling components inside the head. The work light may be powered by either a battery which is releaseably connected to the handle or from an external source via an electrical cord that connects to a socket in the handle. An optical fiber assembly may be releaseably attached to the head over the opening to direct light from source through a fiber optic cable to illuminate small recessed working areas.

14 Claims, 2 Drawing Sheets

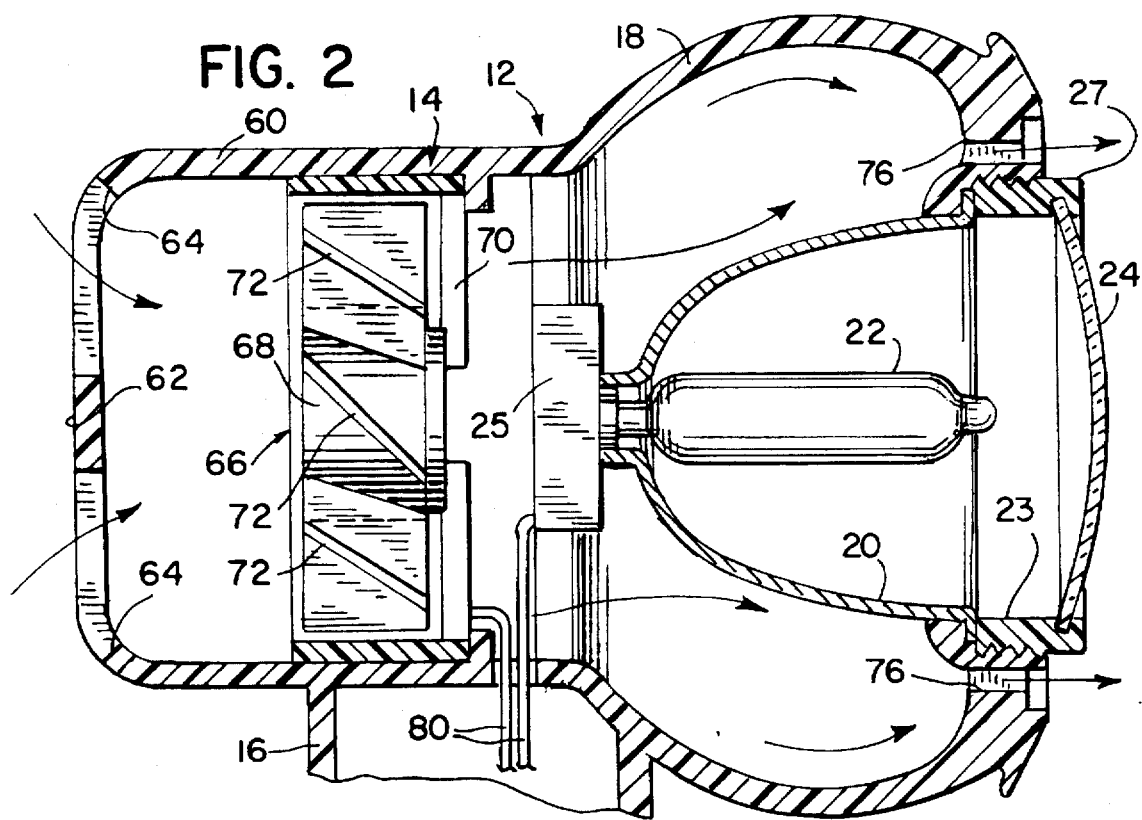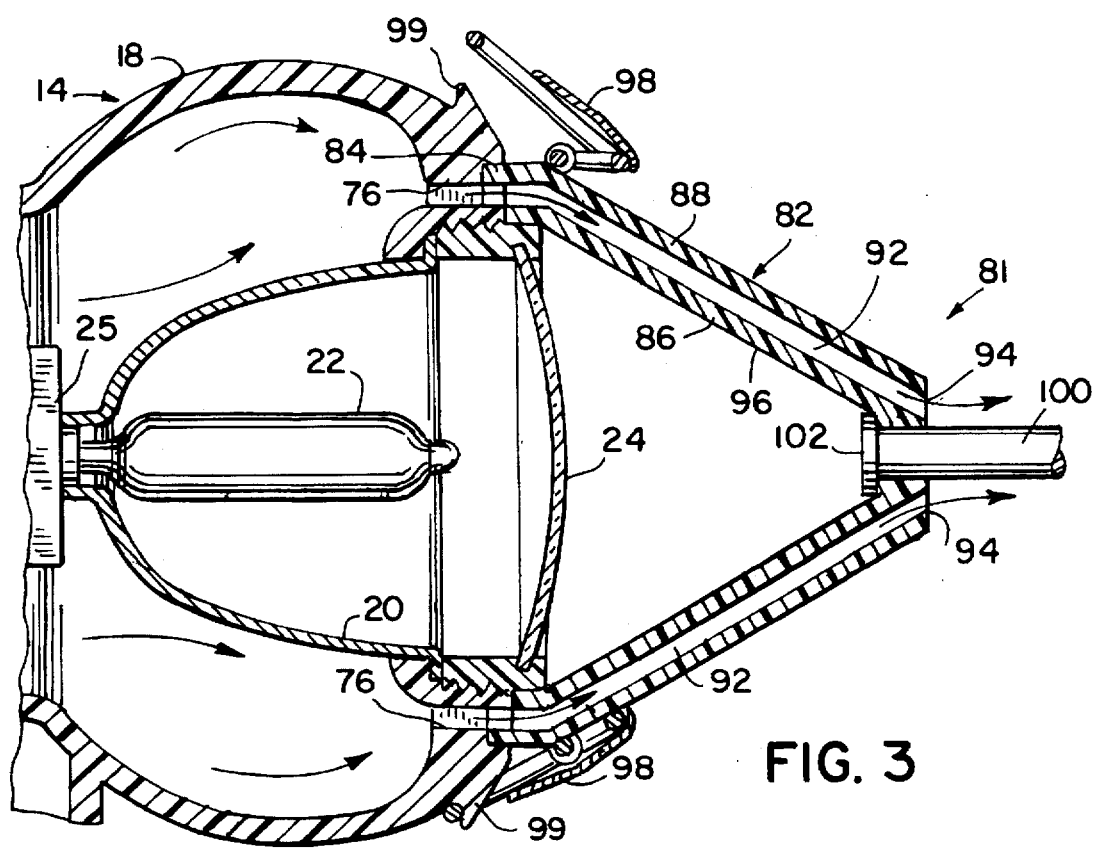

PORTABLE WORK LIGHT WITH OPTICAL FIBER ADAPTER

BACKGROUND OF THE INVENTION

The present invention relates to portable lights for illuminating work areas; and more particularly to battery powered lights and to lights with fiber optic cables.

Mechanics and other working persons frequently require illumination of remote or recessed work spaces, such as those of an automobile engine, that are illuminated insufficiently by room lighting. In order to see in these spaces, mechanics utilize flashlights or corded trouble lights which can be placed adjacent the area being worked upon. In some instances the work space may be so recessed that it cannot be properly illuminated by conventional portable lights. Therefore, it is desirable to provide a source of illuminating these remote recessed work areas.

SUMMARY OF THE INVENTION

A general object of the present invention is to provide a portable light which can provide illumination in severely limited work spaces.

Another object is to provide such a light which has an adapter for transmitting the light from a lamp through a fiber optic cable which can be positioned in very small and recessed work spaces.

A further object of the present invention is to provide a work light which can receive power from a number of sources.

Yet another object is to provide a high intensity work light with a cooling mechanism for the light source.

A still further object of the invention is to provide a work light which can illuminate a relatively large working area and alternatively can be fitted with a fiber optic cable to concentrate illumination in a smaller working area remotely located from the light source.

These and other objectives are satisfied by a portable work light that has a handle with electrical terminals for connection to a battery. A head is pivotally attached to the handle and has a opening, a first air inlet and a first air outlet. A light source and a reflector are mounted within the head to direct light from the light source through the opening. A fan also is mounted inside the head in order to draw air in through the inlet, force the air over a surface of the reflector and then through the outlet to cool components inside the head. A battery is releaseably connected to the handle and engages the electrical terminals to provide electric current which powers the fan and the light source.

An optical fiber adapter includes a coupling which may be releaseably attached to the head over the opening to receive light from the light source. A fiber optic cable has a first end connected to the coupling for receiving light, and a second end from which received light is emitted. In the preferred embodiment, the coupling comprises a conical outer wall and a conical inner wall located concentrically within the outer wall. The inner and outer walls are spaced apart to form an air passage therebetween and the air passage has a second air inlet which communicates with the first outlet of the head. Thus air forced by the fan through the air outlet of the head flows between the inner and outer walls to cool the optical fiber adapter coupling.

BRIEF DESCRIPTION OF THE DRAWINGS

FIG. 2 is a cross-section taken along line 2—2 of FIG. 1; and

FIG. 3 is a cross-sectional view showing a fiber optic cable adapter connected to the work light.

DETAILED DESCRIPTION OF THE INVENTION

Figure 1:
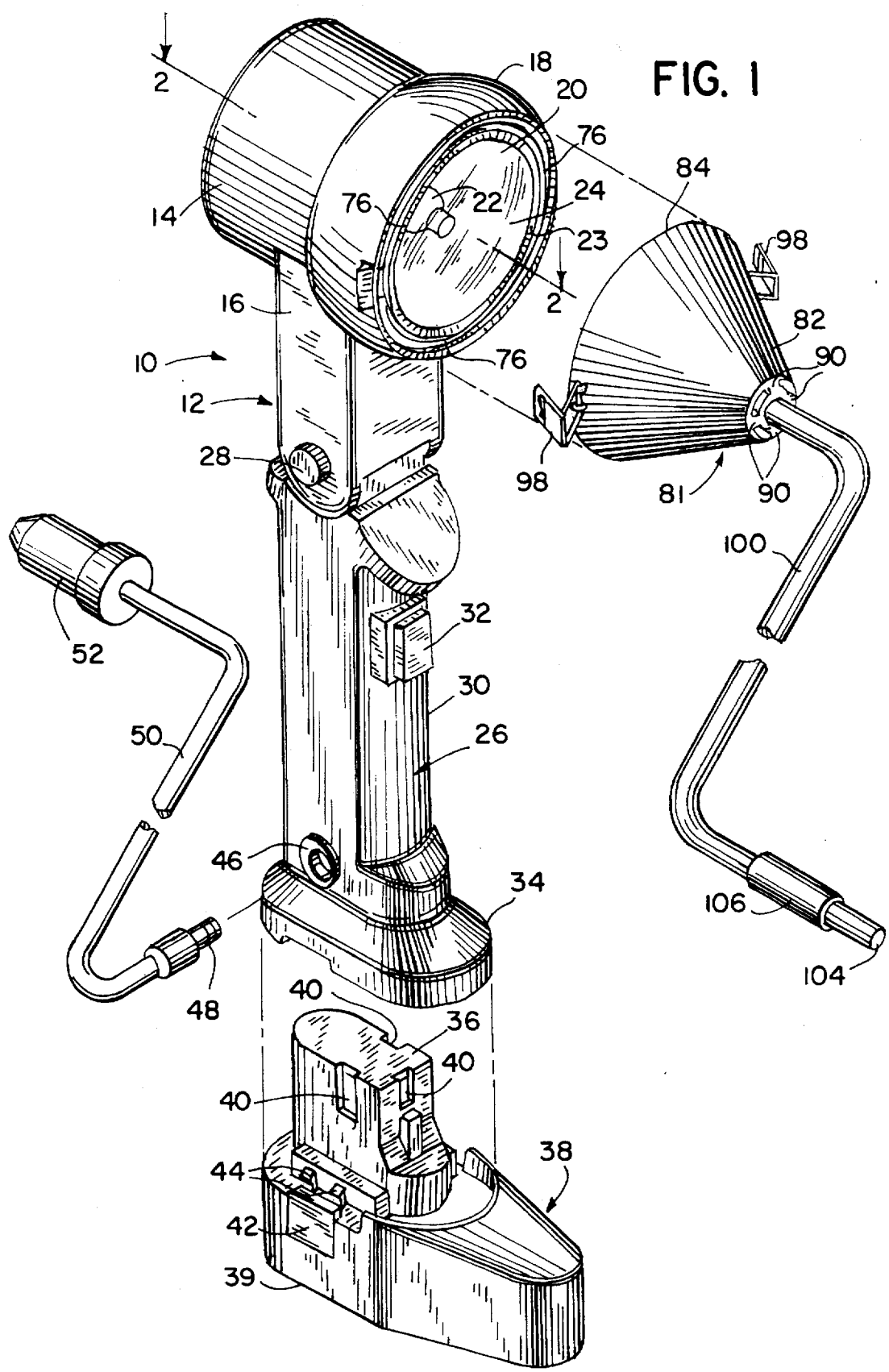
FIG. 1 is an isometric, exploded view of a work light according to the present invention.

With initial reference to FIG. 1, a work light, generally designated as 10, comprises a plastic body 12 with a head 14 to which an arm 16 is attached. The head 14 has a partially spherical front section 18 containing a reflector 20 optical fiber adapter within which a light bulb 22, such as a halogen lamp of the type used in automobile headlights, is located in socket 25. The light bulb 22 and reflector 20 are covered by a convex, transparent window 24 that extends across an opening 23 of the housing front section 18. As shown in FIG. 2, the convex window 24 is contained within a ring 27 which threads into the central opening of the front section 18 and holds the reflector 20 in place against the socket 25. The reflector 20 directs the light from the bulb 22 outward through the transparent window 24.

Referring again to FIG. 1, that body 12 further includes a handle 26 which is pivotally mounted by pin 28 to the arm 16 thereby allowing the head 14 to be tilted forward and backward with respect to the handle. The central portion 30 of the handle 26 is contoured and sized for easy grasping by a hand of the work light user. Within this central portion 30 is an electric switch 32 for turning the work light 10 on and off. For example, switch 32 may be a push-button type which locks in both the on and off positions. The end of the handle 26, which is remote from the head 12, has a socket 34 for receiving a mating connector 36 of a battery pack 38. The battery pack 38 houses a rechargeable battery which can be removed from the handle 26 and placed in a suitable recharging device. The connector 36 has several electrical contacts 40 which engage terminals within the socket 34 to supply electric current from the battery pack 38 to the remaining components of the work light 10. A snap action lock 42 has retaining tabs 44 which releasably engage detents in the socket 34 to secure the battery pack 38 to the handle 26. The battery pack 38 has a enlarged bottom surface 39 which can be placed on a surface at the work site to support the work light 10 in an upright position. The battery pack weight aids in preventing the work light 10 from tipping over in that position.

The handle 26 also has a two-conductor female connector 46 which is adapted to receive a mating plug 48 on one end of an optional electric supply cable 50. The other end of the supply cable 50 has a plug 52 of the type which mates with the socket for a cigarette lighter in a motor vehicle. As a result, through the use of cable 50, the work light 10 can be powered by the battery of the motor vehicle via the cigarette lighter socket as an alternative to the battery pack 38. When the plug 48 of the cable 50 is inserted into the female connector 46, an interlock switch electrically disconnects the battery pack 38 from the circuit within the handle 26 so that the work light 10 only receives power via the electric cable 50. Alternatively, other types of supply cables can be attached to the female connector 46. For example a cable with a pair of battery clips enable the work light 10 to be powered directly from the terminals of the motor vehicle battery. Furthermore, a transformer could be provided to enable the work light 10 to by powered from an electrical wall outlet.

With reference to FIG. 2, the head 14 has a cylindrical rear section 60 with a closed end 62 that has a plurality of openings 64. A cooling fan 66 is located within the rear section 60 and has a direct current electric motor 68 secured via the fan frame 70 to the interior of the head's rear section 60. Electrical wires 80 extend from the switch 32 in the handle section 26 to the lamp socket 25 and the fan motor 68. That motor 68 drives an array of fan vanes which drawn external air through openings 64 at the rear portion 60 of head 14. The light bulb 22 is held in the socket 25 which is supported within the body 12 at the junction between the front and rear sections 18 and 60. Air from the fan 66 is able to flow around the socket 25 into the front section 18 between the reflector 20 and the body 12. Curved outlet slots 76 extend through the annular face of the front section 18 and are spaced around the convex window 24.

Whenever the light bulb 22 is illuminated, the fan motor 68 also is powered to draw air through the openings 64 in the rear section 60 and force that air through the head into the front section 18. The air then flows around the outer surface of the reflector 20 and out of the head through the slots 76 in the face of that front section. The air flow is indicated by the arrows in FIGS. 2 and 3. In addition, openings may be provided in the reflector 20 to allow air to circulate therein around the lamp bulb 22. In this manner, air circulates around the components in the head 14 which are heated by illumination of light bulb 22.

When the work light is configured as shown in FIG. 2, a relatively wide beam of light is produced for illuminating areas being worked upon. Alternatively, the present work light 10 can be adapted to transmit light through a fiber optic cable to provide intense illumination of relatively small or remotely recessed work areas. With reference to FIGS. 1 and 3, an optical fiber adapter 81 comprises a conical-shaped optical coupling 82 with the larger diameter end 84 that is adapted to fit over the window 24 on the front section 18 of the work light head 14. The optical coupling 82 may be formed of aluminum, plastic or a similar material. A pair of fastener clips 98, such as are commonly found on tool boxes, are pivotally attached on opposite exterior sides near the large end 84 of the optical coupling 82. The fastener clips 98 engage hooks 99 on the exterior of the front section 18 of the body 12 to attach the optical fiber adapter 81 to the front head section 18 over the clear window 24.

The optical coupling 82 is formed by inner and outer conical sections 86 and 88, respectively which are spaced apart concentrically, as shown in FIG. 3, by walls 90 that are visible at the small end of the coupling in FIG. 1. The spacing of the conical sections 86 and 88 forms air passages 92 therebetween which connect to the outlet slots 76 in the front section 18 of the body 12. The small end of the conical optical coupling 82 has outlets 94 through which the air from the body 12 is exhausted. The optical coupling 82 is cooled by the flow of air through passages 92.

The small end of the conical optical coupling 82 has a central aperture through which a fiber optic cable 100 extends. The fiber optic cable 100 has one end 102 located within the conical coupling 82 to receive light from bulb 22. The fiber optic cable 100 is formed by a bundle of optical fibers which extend from end 102 to a remote end 104. The conical interior surface 96 of the optical coupling 82 is reflective, either because the coupling is made of a shiny material or has a reflective coating applied thereto if fabricated from a non-shiny material such as plastic. Light from bulb 22 is reflected by reflector 20 and the interior surface 96 of the optical coupling 82 in a manner which directs the light into the end 102 of the fiber optic cable 100. The optical fibers within the cable 100 conduct the light to the remote end 104 from which it is emitted to illuminate the work space. The fiber optic cable 100 is flexible allowing the remote end 104 to be inserted into very small, recessed work spaces to provide illumination.

The present work light 10 is very versatile providing a highly intense light source to illuminate work places. The work light may be powered either by the self-contained battery pack 38 or by cable 50 from an external electricity supply, such as an automobile battery. A first battery pack 38 can be removed for recharging by a separate device, and a second battery pack can power the work light 10 while the first battery pack is recharging. In addition, the work light 10 can produce a relatively wide beam of illumination for large work areas or have the optical fiber adapter 81 connected over the window 24 to transmit light through the flexible fiber optic cable 100 to intensely illuminate relatively small areas.

I claim:

1. A portable work light comprising:

a handle having electrical terminals for connection to a battery;

a head pivotally attached to the handle and having a opening, a first air inlet and a first air outlet, said head having a light source with a reflector to direct light from the light source through the opening;

a fan mounted within said head for drawing air through the inlet, forcing the air over a surface of the reflector and through the outlet;

a battery releaseably connected to the handle and engaging the electrical terminals for receiving electricity to power the fan and the light source; and an optical fiber adapter having a coupling for releaseably attaching to said head over the opening to receive light from the light source, and a fiber optic cable with a first end connected to the coupling for receiving light and a second end from which received light is emitted.

2. The portable work light as recited in claim 1 further comprising a first electrical connector in one of the head and the handle.

3. The portable work light as recited in claim 2 further comprising an electrical cord having a second electrical connector which mates with the first electrical connector.

4. The portable work light as recited in claim 4 wherein the electrical cord has a third electrical connector for coupling to an electrical circuit of a motor vehicle.

5. The portable work light as recited in claim 3 wherein the electrical cord has a third electrical connector for coupling to a socket for a cigarette light in a motor vehicle.

6. The portable work light as recited in claim 1 wherein the head has a first fastener member and the coupling has a second fastener member which engages the first fastener member to releaseably attach the optical fiber adapter to the head.

7. The portable work light as recited in claim 1 further comprising a transparent window extending across the opening in the head.

8. The portable work light as recited in claim 1 wherein the first air outlet is adjacent to the opening.

9. The portable work light as recited in claim 1 wherein the coupling of the optical fiber adapter comprises:

an outer element defining a first chamber within which light from the opening is received, and the first end of the fiber optic cable communicating with the first chamber; and an inner element extending around the outer element and forming an air passage therebetween, the air passage having a second air inlet which communicates with the first outlet of the head and having a second air outlet from which air moved by the fan flows.

10. The portable work light as recited in claim 1 wherein the coupling of the optical fiber adapter comprises:

an outer wall having a conical shape;

an inner wall having a conical shape and mounted within the outer wall with an air passage therebetween, the air passage having a second air inlet which communicates with the first outlet of the head and having a second air outlet from which air moved by the fan flows.

11. The portable work light as recited in claim 10 wherein the inner wall is substantially concentric with the outer wall.

12. A portable work light comprising:

a handle having electrical terminals for connection to a battery, and having an electrical connector;

a head pivotally attached to the handle and having a opening, a first air inlet and a first air outlet, said head having a light source with a reflector to direct light from the light source through the opening;

a fan mounted within said head for drawing air through the inlet, forcing the air over a surface of the reflector and through the outlet;

a switch assembly operably connected to control a flow of electric current from the electrical terminals and the electrical connector to the fan and the light source;

a battery releaseably connected to the handle and engaging the electrical terminals for receiving electricity to power the fan and the light source;

an electrical cord having a second electrical connector which mates with the first electrical connector; and an optical coupling releaseably attached to said head over the opening to receive light from the light source, said optical coupling having an outer wall with a conical shape, and an inner wall with a conical shape and concentrically within the outer wall thereby defining an air passage therebetween, the air passage having a second air inlet which communicates with the first outlet of the head and having a second air outlet from which air moved by the fan flows;

a fiber optic cable with a first end connected to the coupling to receive light from the light source and having a second end from which received light is emitted.

13. The portable work light as recited in claim 12 wherein the head has a first fastener member and the coupling has a second fastener member which engages the first fastener member to releaseably attach the optical fiber adapter to the head.

14. The portable work light as recited in claim 12 further comprising a transparent window extending across the opening in the head.

* * * * *

UNITED STATES PATENT AND TRADEMARK OFFICE
CERTIFICATE OF CORRECTION

PATENT NO. : 5,746,495
DATED : May 5, 1998
INVENTOR(S) : Thomas L. Klamm

It is certified that error appears in the above-indentified patent and that said Letters Patent is hereby corrected as shown below:

In column 4, line 23 (claim 1), change of "having a" to --having an--.

In column 4, line 64 (claim 9), change "outer" to --inner--.

In column 5, line 1 (claim 9), change "inner" to --outer--.

In column 5, line 1 (claim 9), change "outer" to --inner--.

In column 5, line 19 (claim 9), change "having a" to --having an--.

Signed and Sealed this

Twenty-fifth Day of August, 1998

Attest:

BRUCE LEHMAN

*Attesting Officer*  *Commissioner of Patents and Trademarks*